UNITED STATES PATENT OFFICE.

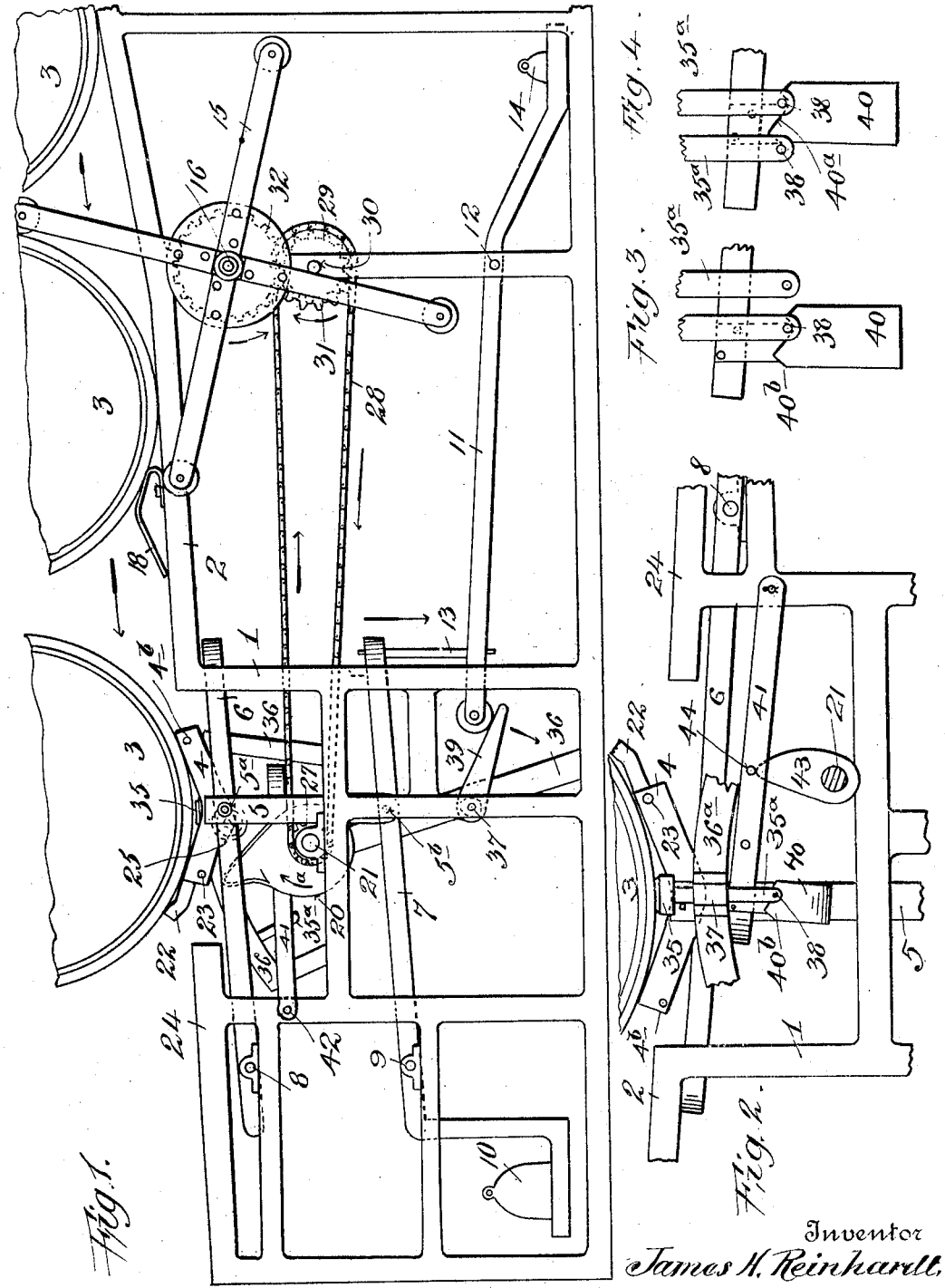

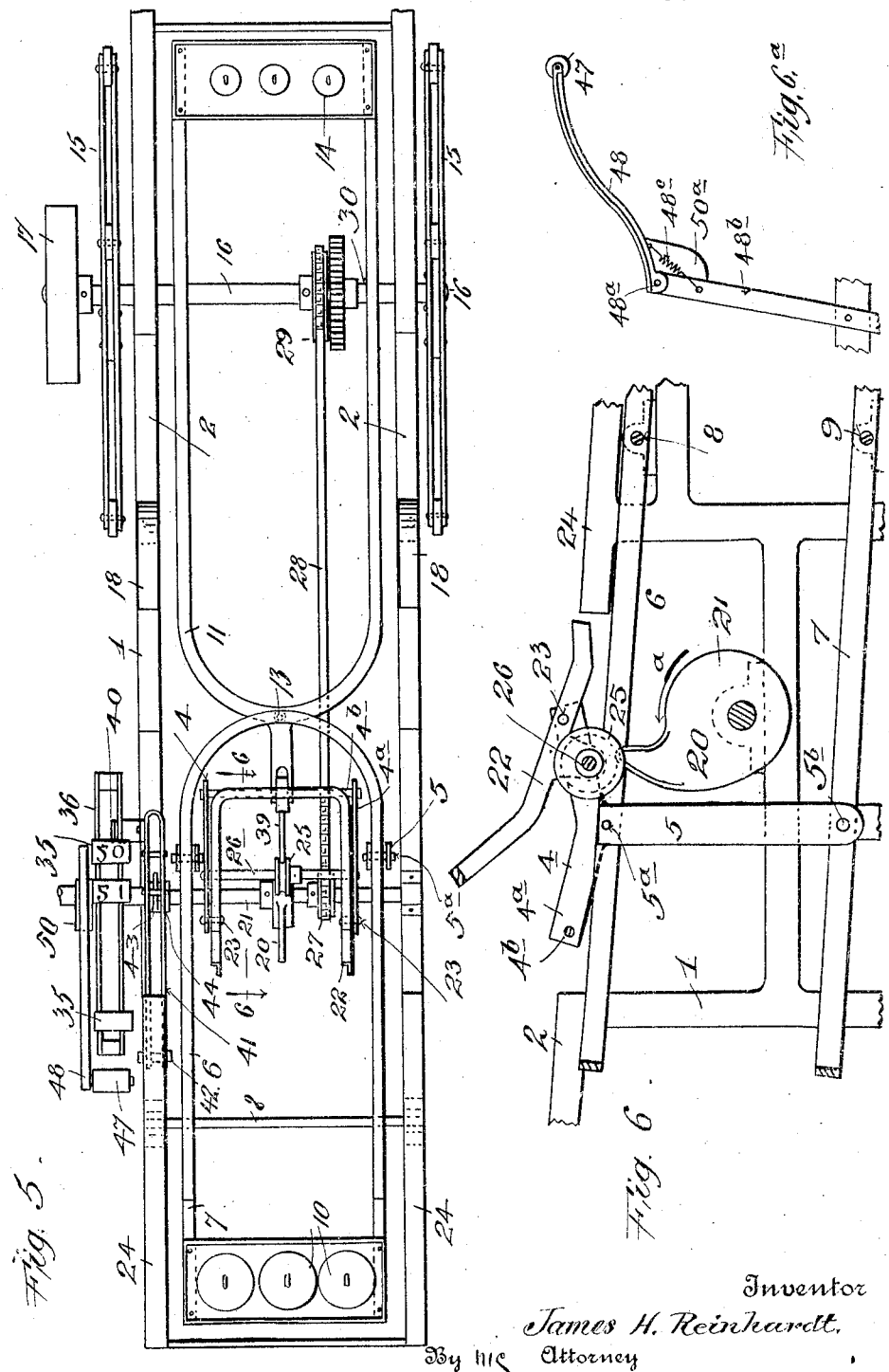

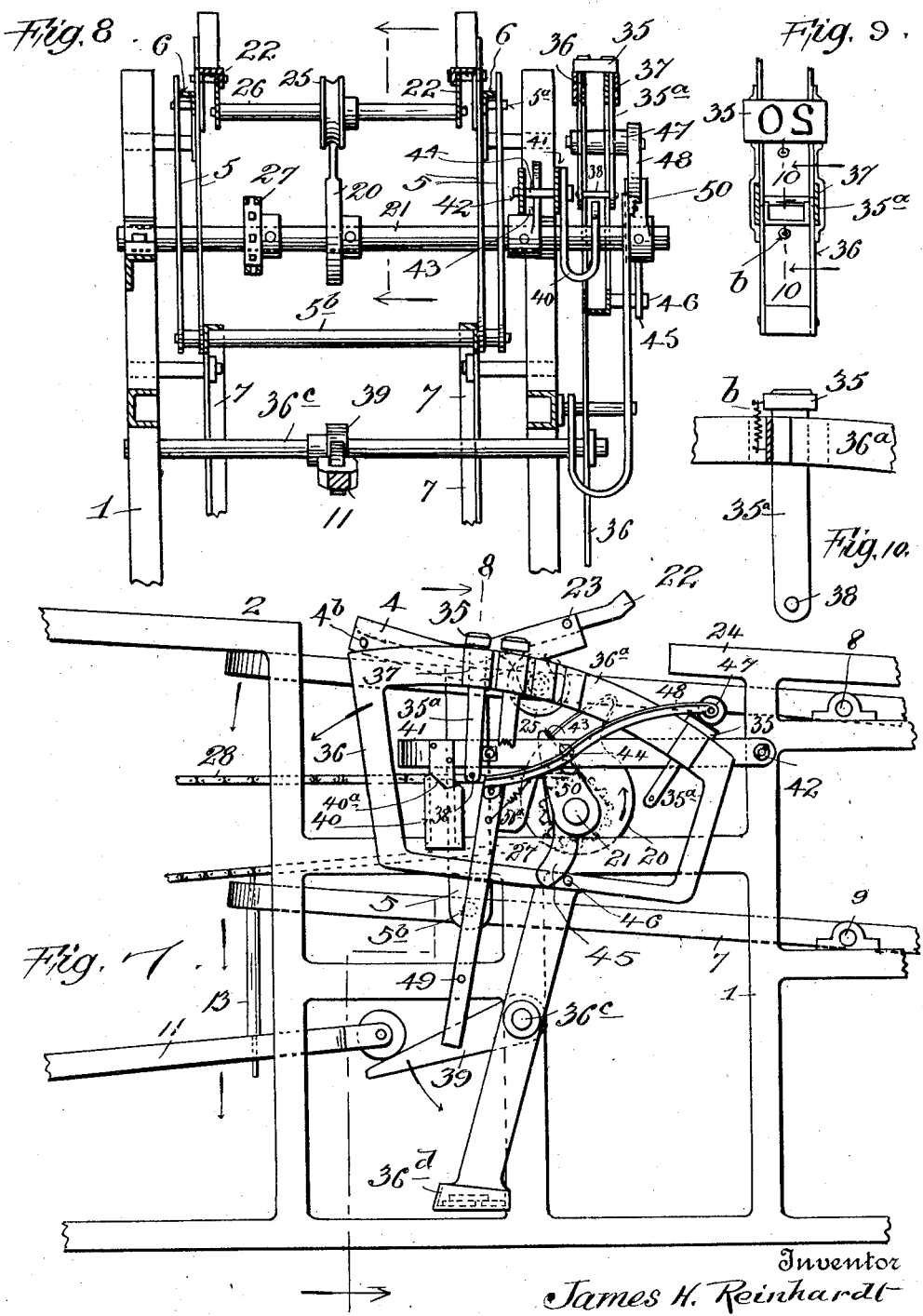

JAMES H. REINHARDT, OF EAST ORANGE, NEW JERSEY, ASSIGNOR OF ONE-HALF TO FEDERAL SUGAR REFINING COMPANY, OF NEW YORK, N. Y., A CORPORATION OF NEW YORK.

WEIGHING-MACHINE.

1,343,476. Specification of Letters Patent. Patented June 15, 1920.

Application filed April 3, 1916. Serial No. 88,469.

*To all whom it may concern:*

Be it known that I, JAMES H. REINHARDT, a citizen of the United States, and resident of East Orange, in the county of Essex and State of New Jersey, have invented certain new and useful Improvements in Weighing-Machines, of which the following is a specification.

One of the objects of my invention is to provide simple and efficient means to enable the weighing of barrels and analogous articles, successively, and the printing or stamping of the weight thereof or other indication upon such articles during their passage through the machine. A particular feature of my invention relates to the weighing of empty barrels and the like and printing or stamping thereon the weight thereof to indicate tare.

Another object of my invention is to provide means to prevent jarring of the weighing mechanism by its sudden operation when a barrel or the like is deposited thereon, and to permit such mechanism to operate gradually under the weight of such barrel or the like to avoid vibration of the weighing mechanism, and to cause the barrel or the like to come to rest ready to be printed or stamped.

Another object of my invention is to permit printing upon barrels a number corresponding to its weight, or nearest to the true weight although the barrel may weigh several ounces more or less respecting such true weight, according to the custom of trade, commonly called a "give and take."

Further objects of my invention and novel details of improvement will be more fully hereinafter set forth and then pointed out in the claims.

Reference is to be had to the accompanying drawings forming part hereof, wherein:

Figure 1 is a side elevation of a weighing machine embodying my invention;

Fig. 2 is a partly broken side view looking from the opposite side of Fig. 1;

Figs. 3 and 4 are details hereinafter referred to;

Fig. 5 is a plan view;

Fig. 6$^a$ is a detail of the inking roller arms;

Fig. 6 is a detail vertical section substantially on the plane of the line 6, 6, in Fig. 5;

Fig. 7 is a side view of part of the machine on an enlarged scale, looking from the opposite side of Fig. 1;

Fig. 8 is a section on the line 8, 8, in Fig. 7;

Fig. 9 is a detail plan, enlarged, of printing devices; and

Fig. 10 is a detail section substantially on the line 10, 10, in Fig. 9.

Similar numerals of reference indicate corresponding parts in the several views.

In the accompanying drawings the numeral 1 indicates a suitable frame, provided with a conveyer, track or runway 2, upon which barrels 3, or other objects, to be weighed are adapted to travel for delivery to weighing mechanism. At 4 is a support for barrels, which support is connected with weighing mechanism or scale beams, support 4 being normally maintained in position to receive barrels from track 2. The support 4 is shown comprising side bars 4$^a$ and a cross bar 4$^b$ connected with the side bars, (Fig. 5). Support 4 is shown pivotally connected by links 5, as at 5$^a$, 5$^b$, with rocking arms 6, 7, spaced one above another and respectively pivotally supported at 8, 9, upon frame 1, whereby said arms 6, 7, will rock in unison. By reason of positive connection of links 5 with support 4, and a pivotal connection of said links with the arms 6, 7, the support 4 will be maintained in proper position to support barrels thereon in different positions of elevation of said support. One of said arms, such as arm 7, may be in the nature of a scale beam, adapted to support one or more weights 10, to counterbalance or weigh the barrel when upon support 4. If it be assumed that barrels will weigh from 20 to 27 pounds each, the weight or weights 10 may be adapted to about counterbalance the least weight of barrels to be weighed for the least depression of support 4 by such a barrel thereon. In order to provide for counterbalancing barrels of a greater weight than that named, and to provide for delicacy of operation, I have shown a supplemental beam 11, pivotally supported upon frame 1 at 12, and adapted to be rocked by beam 7, as by an interposed member 13. Beam 11 is adapted to support one or more weights 14, which may be smaller than the weights 10, whereby the combined weights will balance and weigh the barrels that weigh between the lowest and highest weights intended to be weighed at a given time. It will be understood, however, that the beam 11 may be dispensed with, and all weighing accomplished by means of beam 7 and its weights, or springs connected with said beam instead of the weights.

I have shown means to feed the barrels or the like to support 4 successively, and step by step, comprising arms 15, adapted to receive suitable portions of barrels between them, shown spaced apart at opposite sides of the frame on opposite sides of track 2, and carried upon a shaft 16 journaled in the frame. Shaft 16 may be driven in any suitable manner, as by a pulley 17 on said shaft receiving a belt from any suitable power transmitting mechanism. At 18 are stops upon track 2 against which the barrels may temporarily rest and be pushed thereover by arms 15 to cause the barrels to be advanced along the track to support 4 in a desired manner.

In order to cause the barrels or the like to rest upon support 4 before the latter descends from the normal counterbalancing position, and to enable the barrels to descend slowly until they are counterbalanced by the weighing mechanism, I provide a cam 20 that is secured upon a shaft 21 supported to rotate in bearings in frame 1, which cam is adapted to so coact with support 4 as to resist downward thrust of the latter when the barrel first rests upon said support. Thereafter by rotation of said cam the support is permitted to descend to a distance according to the weight of the barrel, while the support is supported by the cam, and then the cam will release the support to permit free weighing of the barrel, a continued movement of the cam, after the weight of the barrel has been printed or stamped thereon, (as hereinafter explained) causing the support to rise and lift the barrel. In order to discharge the barrel from support 4 after the barrel has been weighed and printed or stamped, I provide upon support 4 a movable discharger 22 that is operated by cam 20 when the latter has raised support 4 and the barrel to the barrel discharging position. I have shown discharger 22 as somewhat in the form of a yoke (Fig. 5) pivotally carried at 23 near one side of support 4, and adapted to be operated by cam 20 to discharge barrels to the receiver or track 24, of frame 1, whence the barrels are removed. As a convenient means for such purpose I have shown discharger 22 provided with a roller 25 supported upon shaft 26 carried by discharger 22, said roller being in position to be engaged by cam 20. The arrangement described is such that when the barrel rests upon support 4 and discharger 22, the latter will be folded or closed with respect to said support, (Figs. 1, 2 and 7), and thereupon the appropriate part of cam 20 will be in engagement with roller 25 to prevent sudden depression of support 4. A continued rotation of said cam (in the direction of the arrow $a$ in Figs. 1 and 6) enables the depression of the support, the discharger and the weighing mechanism under the weight of the barrel on the support until the cam releases the roller. Thereafter, when the appropriate part of the cam again engages roller 25, support 4, discharger 22 and the barrel will be returned to the normal position by the cam, and a further rotation of the cam will tilt discharger 22 with respect to the support 4 (Fig. 6), to cause the barrel to roll to the receiver or track 24, a further rotation of the cam permitting the discharger to return to the normal position with its free end resting upon the cross bar $4^b$ of support 4. Shaft 21 may be rotated in any suitable manner, and timed with respect to the delivery of barrels upon the support 4. For such purpose I have shown shaft 21 provided with a sprocket wheel 27 receiving chain 28 that passes around sprocket wheel 29 secured to shaft 30 journaled upon frame 1. Shaft 30 is provided with a gear 31 meshing with a gear 32 secured on shaft 16, whereby power is communicated from pulley 17 to shaft 21, although it will be understood that shaft 21 may have the pulley for driving shaft 16 through the gearing referred to.

In order to print or stamp upon the barrel or the like its weight as determined by the scale mechanism, I provide printing means having type located in position to be impressed upon the barrel, and operated to print or stamp the weight thereon after the barrel has been weighed while upon support 4. For such purpose I have shown type members 35 having the desired type thereon, suitably spaced apart, and located below the barrel when it is on support 4. Assuming that the weight of the barrel is to be printed or stamped thereon in accordance with whole numbers of pounds, such as 20, 21, 22, etc., as distinguished from whole numbers and fractions of pounds, and that the weight of certain barrels may vary, such as between 20 and 27 pounds, then provision will be made for eight such type members 35, each bearing a consecutive number from 20 to 27 inclusive. The type members 35, as illustrated, are carried by a rocking frame 36, adapted to rock under the barrels when they are on support 4. The frame 36 is secured upon a shaft 36ᶜ journaled in frame 1, frame 36 being provided with suitable counterweights 36ᵈ (Fig. 7) to properly balance the same. Frame 36 is shown provided with a projection 39 to be actuated by beam 11 when the latter is depressed by the weight of a barrel on support 4, to thereby cause frame 36 to be properly rocked, according to the weight of the barrel, to bring the type member 35 corresponding to such weight in printing position beneath the barrel. Frame 36 is shown at one side of support 4 (Fig. 8) in position to print the number on the portion of the barrel projecting beyond said support. The type members 35 are guided to slide upon the upper portion 36ᵃ of frame 36. I have shown type members 35 as provided with spaced downwardly extending arms 35ᵃ slidably carried in guides 37 upon frame 36, the lower ends of corresponding pairs of arms 35ᵃ being connected by pins 38, (Figs. 3, 4, 8 and 10). Springs b connecting type members 35 with frame 36 normally tend to draw said members downwardly, or away from the barrel to their normal positions (Figs. 9 and 10). The type members 35, in their normal positions, are arranged on a curve less than an arc described around the axis of shaft 36ᶜ, the upper part 36ᵃ of frame 36 being correspondingly arranged, so that said type members may be brought to printing position beneath the barrels, according to the depression of support 4 by barrels of different weight. The arms 35ᵃ of members 35 are correspondingly short, as from left to right, in Fig. 7, to coact with a type actuator 40, in different positions of rocking frame 36, actuator 40 being adapted to push arms 35ᵃ and thereby move the corresponding type into printing contact with the barrel. Actuator 40 is shown carried by an arm 41 that is pivotally supported at 42 upon frame 1. A cam 43, secured on shaft 21, is adapted to engage pin or the like 44 on arm 41 (Figs. 2, 5, 7 and 8) to raise arm 41 at the proper time, and thereby raise type actuator 40 to cause the latter to force the type against the barrel. In the normal position of the parts all of the arms 35ᵃ of the type members 35 are out of coactive relation to actuator 40, such as being at the righthand side thereof, (Fig. 7), whereby a barrel of the least weight placed upon support 4 and depressing the latter the least, will, through the depression of beam 11, in coaction with projection 39, cause frame 36 to be moved to the left in Fig. 7 to bring the lefthand arms 35ᵃ in said figure in coöperative relation to actuator 40, and, likewise, a barrel of greater weight, causing further depression of support 4, will cause further rocking of frame 36, (to the left in Fig. 7) to present the appropriate type member 35 under the barrel in coactive relation to actuator 40.

Frame 36 is so balanced as to always tend to swing the type members toward the right in Fig. 7, to normally retain the type member having the lowest printing number approximately in printing position, the projection 39 at such time being in coaction with beam 11, whereby frame 36 is maintained in normal position.

Any suitable means may be provided to apply ink to the type members 35. For such purpose I have shown an inking roller 47 carried by an arm 48 pivotally connected at 48ᵃ with an arm 48ᵇ that is pivotally supported at 49 upon frame 1. A spring 48ᶜ, connecting arms 48 and 48ᵇ tends to cause the inking roller 47 to bear lightly upon the type members 35 in different positions of frame 36. Arm 48ᵇ is adapted to be operated by a cam 50 secured on shaft 21 for causing inking roller 47, at the proper time, to roll over certain type members 35 in the direction of the barrel, to apply ink to said members. Since it would not be convenient to cause the inking roller 47 to roll between a barrel and the type member beneath the same, I cause the frame 36 to be moved toward the right in Fig. 7 for a sufficient distance to cause certain type members 35 to engage inking roller 47, after the latter has been moved a suitable distance by cam 50 to the left in Fig. 7. For this purpose I have shown a cam or projection 45 secured on shaft 21 (Fig. 7) adapted to engage a pin or projection 46 on frame 36, said cam or projection being adapted to cause frame 36 to be moved to the right at the proper time. The arrangement illustrated is such that cam 50, by engaging a projection 50ᵃ on arm 48ᵇ, will cause said arm to move to the left in Fig. 7 to carry inking roller 47 over certain type members 35, and at the same time projection or cam 45, by engaging projection 46, will cause frame 36 to move to the right in Fig. 7 sufficiently far with respect to roller 47 to cause the latter to engage the lefthand type member 45, and thereupon when said cams release said projections the inking roller will return to the normal position at the right, as by gravity, and frame 36 will return toward the left to its normal position. When frame 36 is moved to the right (Fig. 7) projection 39 will raise beam 11 and when projection 45 releases pin 46, the weight of said beam will tend to cause frame 36 to move back to normal.

In the example of my invention illustrated in the accompanying drawings, it is assumed that whole numbers are to be printed upon the barrels, and that in case a barrel weighs a fraction of a pound more or less than a given whole number, that nevertheless such whole number that is nearest to the fraction will be printed or stamped upon the barrel. To carry out the purposes last named, I have shown the type actuator 40 so arranged and located that notwithstanding the particular position with respect to a barrel to which a type member 35 may be brought when the barrel has been properly balanced and weighed when resting upon support 4, the actuator 40 will cause the type member 35, corresponding to the whole number nearest to the weight of the barrel, to be brought into printing position under the barrel, as by properly causing the rocking of frame 36 for the purpose, and then to cause impression of the type upon the barrel. To this end the upper edge of actuator 40 is recessed, in a sort of widened V, having inclined edges to receive the pin 38 of a type member, the inclined edges of the recess 40ᵃ at the upper edge of actuator 40 causing the pin 38 to ride into the crotch of the recess, although such pin may, when frame 36 is shifted by the weight of the barrel, have been brought to rest at one side of a vertical line through such crotch. In other words, if a pin 38 of a type member is brought to rest at one side of a vertical line passing through the crotch of recess 40ᵃ, corresponding to a fraction of a pound less than one-half pound on either side of the whole number represented by such type member 35, the actuator 40, when raised by cam 43, will first cause shifting of frame 36 to the right or left to center the pin 38 in the crotch of recess 40ᵃ, and a further upward movement of actuator 40 will cause printing of the type upon the barrel. If, however, the weight of the barrel causes a pin 38 of a given type member 35 to just rest on one side of the outwardly inclined edge 40ᵇ of actuator 40, then when such actuator rises, it will cause the pin 38 of arm 35ᵃ at the left in Fig. 4, to ride down the inclined edge 40ᵇ, thereby causing frame 36 to be moved to the left to bring the adjacent righthand arm 35ᵃ over recess 40ᵃ, so that the corresponding pin 38 will be caused to ride down the righthand inclined edge of recess 40ᵃ substantially to the operating position shown in Fig. 4, thus causing the printing on the barrel on support 4 of the type of a whole number greater than the number of the type member at the left in Fig. 4, although the actual weight of the barrel is less than such printed whole number, but greater than a half-pound fraction more than the whole number of the type at the left in Fig. 4. This provides for printing whole numbers nearest to half-pound fractions on either side of such number, commonly called "give and take" and permissible by custom of trade.

While I have herein referred to the type members 35 as adapted to print the weight of empty barrels thereon, for the purpose of indicating tare, it will be understood, of course, that my improvements are equally adapted to print the weight of filled barrels thereon, appropriate numerals for such purpose being applied upon type members 35. It will also be obvious that while I have referred to printing the weight upon barrels, my improvements may be utilized for printing the weight upon other articles, suitably fed to the weighing mechanism.

Having now described my invention what I claim is:—

1. A weighing machine comprising weighing mechanism, a plurality of type members, means supporting said type members for movement to printing position, means interposed between said weighing mechanism and the second named means for moving the appropriate type member substantially to printing position, an actuator adapted to operate any of said type members for printing, and means to operate said actuator to cause printing upon the article being weighed.

2. A weighing machine comprising weighing mechanism, a plurality of type members, means supporting said type members for movement to printing position, means interposed between said weighing mechanism and the second named means for moving the appropriate type member substantially to printing position, an actuator adapted to operate any of said type members for printing, said actuator having means to cause a type member to be moved from a position set by the weight of an article being weighed on said mechanism to printing position with respect to said article, and means to operate the actuator to cause printing upon the article being weighed.

3. A weighing machine comprising weighing mechanism, a plurality of type members, means supporting said type members for movement to printing position, means interposed between said weighing mechanism and the second named means for moving the appropriate type member substantially to printing position, an actuator adapted to operate any of said type members for printing, said actuator having downwardly converging edges to coact with said type members to move either of said members from a position set by an article being weighed on said mechanism at one side of the printing position to such position, and means to operate the actuator to cause printing upon the article being weighed.

4. A weighing machine comprising weighing mechanism, a plurality of type members, means supporting said type members for movement to printing position, means interposed between said weighing mechanism and the second named means for moving the appropriate type member substantially to printing position, an actuator adapted to operate any of said type members for printing, said actuator having downwardly converging edges to coact with said type members to move either of said members from a position set by an article being weighed on said mechanism at one side of the printing position to such position, said actuator having a portion to coact with one type member to cause another type member to be moved into operative relation to said actuator for printing, and means to operate the actuator to cause printing upon the article being weighed.

5. A weighing machine comprising weighing mechanism adapted to have a counterpoising effect variable with displacement, a frame movably supported adjacent said mechanism, spaced type members movably carried in a row on said frame and disposed at different distances from its pivot adapted to be brought into contact with the article on the scale, means interposed between said weighing mechanism and said frame for moving the latter to carry the type substantially to printing position according to the weight of an article being weighed, and means to operate said type members when in the printing position.

6. A weighing machine comprising weighing mechanism adapted to have a counterpoising effect variable with displacement, a frame movably supported adjacent said mechanism, spaced type members movably carried in a row on said frame and disposed at different distances from its pivot adapted to be brought into contact with the article on the scale, means interposed between said weighing mechanism and said frame for moving the latter to carry the type substantially to printing position according to the weight of an article being weighed, an actuator for said type members having means to cause either of said type members to be brought to printing position, and means to operate said actuator.

7. A weighing machine comprising weighing mechanism, a frame pivotally supported and having spaced guides, type members having arms movably supported in said guides, said type members being normally at different distances from the axis of said frame and having arms of different lengths, an actuator to operate any of said arms when brought in operative relation thereto, and means to operate said actuator, said frame having a projection coactive with said weighing mechanism whereby the frame may be moved to bring type substantially into printing position with respect to an article on said support according to the weight of said article.

8. A weighing machine comprising weighing mechanism having a support for articles to be weighed, means for placing articles on said mechanism, means coactive with said mechanism to prevent sudden operation thereof when an article is placed thereon, and comprising means to automatically permit the gradual descent of said mechanism in timed relation to the deposit of the article thereon and release of the mechanism for balancing said article.

9. A weighing machine comprising weighing mechanism having a support for articles to be weighed, a cam coactive with said mechanism to resist sudden operation thereof when an article is placed thereon, said cam serving to permit gradual depression of said mechanism under the weight of the article thereon, and means to operate said cam in timed relation to the deposit of the article on the weighing mechanism.

10. A weighing mechanism comprising a plurality of arms one below another, links pivotally connecting said arms, an article support carried by said links whereby the support is balanced in different positions of said arms, means to place articles on said supports, and means to automatically permit the gradual descent of said support with an article thereon and release of the support for counterbalancing said article in timed relation to the deposit of the article on the weighing mechanism.

11. A weighing machine comprising weighing mechanism having a support for articles to be weighed, a discharger pivotally carried by said support at one side thereof, and a cam coactive with said discharger to resist sudden descent of the support and discharger when an article is placed thereon, said cam serving to permit gradual depression of said support and discharger under the weight of the article thereon and release thereof, and means to operate said cam.

12. A weighing machine comprising weighing mechanism, a track to deliver articles to said mechanism, spaced arms adjacent to said track to receive articles to be weighed, said track having a stop for articles on the track, and means to rotate said arms step by step, said arms serving to feed articles to and push them from said stop.

13. A weighing machine comprising weighing mechanism, means coactive with said mechanism to control the operation of the latter under the weight of an article thereon, and mechanism to cause said means to operate in timed relation to the deposit of articles on the weighing mechanism.

14. A weighing machine comprising weighing mechanism, means coactive with said mechanism to control the operation of the latter under the weight of an article thereon, mechanism to cause said means to operate in timed relation to the deposit of articles on the weighing mechanism, and means to discharge articles from the weighing mechanism after the articles have been weighed thereon.

15. A weighing machine comprising weighing mechanism, means coactive with said mechanism to control the operation of the latter under the weight of an article thereon, mechanism to cause said means to operate in timed relation to the deposit of articles on the weighing mechanism, and means to feed articles successively to the weighing mechanism in timed relation to the weighing of the articles on the mechanism.

Signed at New York city, in the county of New York and State of New York, this 31st day of March, A. D. 1916.

JAMES H. REINHARDT.

Witness:
T. F. BOURNE.